(12) United States Patent
Haham et al.

(10) Patent No.: US 8,893,144 B2
(45) Date of Patent: Nov. 18, 2014

(54) SYSTEMS AND METHODS FOR PARALLEL EXECUTION OF A PORTION OF A SCRIPT BY INTERPRETING COMMENTS IN THE SCRIPT AS PARALLEL CONTROL STATEMENTS

(75) Inventors: Uri Haham, Pardes Hana-Karkur (IL); Guy Rozenwald, Ra'anana (IL); Tal Kellner, Hertzlia (IL)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 13/108,731

(22) Filed: May 16, 2011

(65) Prior Publication Data

US 2012/0297389 A1 Nov. 22, 2012

(51) Int. Cl.
  *G06F 9/455* (2006.01)
  *G06F 9/46* (2006.01)
  *G06F 9/44* (2006.01)
  *G06F 9/45* (2006.01)

(52) U.S. Cl.
  CPC .............. *G06F 8/314* (2013.01); *G06F 8/445* (2013.01); *G06F 8/451* (2013.01)
  USPC .......................................... 718/104; 718/100

(58) Field of Classification Search
  None
  See application file for complete search history.

(56) References Cited

U.S. PATENT DOCUMENTS

| | | | | |
|---|---|---|---|---|
| 6,061,698 A * | 5/2000 | Chadha et al. | ................ | 715/207 |
| 6,697,835 B1 * | 2/2004 | Hanson et al. | ................ | 709/201 |
| 7,222,333 B1 * | 5/2007 | Mor et al. | ...................... | 717/115 |
| 7,823,164 B2 * | 10/2010 | Gibbs et al. | ................... | 719/313 |
| 7,831,614 B2 * | 11/2010 | Deffler | .......................... | 707/779 |
| 7,840,585 B2 * | 11/2010 | Ramsey et al. | ............... | 707/764 |
| 2003/0204552 A1 * | 10/2003 | Zuberi | .......................... | 709/103 |
| 2012/0110433 A1 * | 5/2012 | Pan et al. | ...................... | 715/234 |

* cited by examiner

*Primary Examiner* — Meng An
*Assistant Examiner* — Bradley Teets
(74) *Attorney, Agent, or Firm* — Buckley, Maschoff & Talwalkar LLC

(57) ABSTRACT

According to some embodiments, a script written in a scripting programming language may be received (e.g., by a script executer). It may be determined that a first line in the script comprises a first comment, and the first comment may be interpreted as an embedded parallel part control statement. Parallel execution of a portion of the script may then be automatically arranged in accordance with the parallel part control statement.

9 Claims, 12 Drawing Sheets

300

310 {
--SECTION A
Whenever error STOP —— 312

--PART A1
CREATE TABLE table1 ...;
CREATE TABLE table2 ...;
CREATE TABLE table3 ...;
--END PART A1

--PART A2
--Whenever error CONTINUE —— 314
DROP TABLE table4;
CREATE TABLE table4 ...;
--END PART A2

--END SECTION A

320 {
--SECTION B
--Set priority HIGH —— 322
--Whenever error CONTINUE and NOTIFY —— 324

--PART B1
LOAD INTO table2 ...;
LOAD INTO table3 ...;
--END PART B1

--PART B2
LOAD INTO table1 ...;
--END PART B2

--PART B3
--Whenever error PERFORM —— 326
       A->A2 WITH 2 RETRIES
LOAD INTO table4 ...;
--END PART B3

--END SECTION B (CONTINUED ON FIG. 3B)

ORIGINAL SQL SCRIPT

CREATE TABLE A ...
LOAD TABLE A ...
CREATE UNIQUE INDEX A1 ON TABLE A ...
CREATE INDEX A2 ON TABLE A ...
CREATE TABLE B ...
LOAD TABLE B ...
CREATE UNIQUE INDEX B1 ON TABLE B ...
CREATE INDEX B2 ON TABLE B ...
.
.
.
CREATE TABLE N ...
LOAD TABLE N ...
CREATE INDEX N1 ON TABLE N ...

TEMPLATE FILE

```
--SECTION CREATE TAB
--WHENEVER ERROR STOP        }— 632
--PART CT_TAB
--FOREACH              ,— 634
CREATE TABLE ... ; ―
--END FOREACH
--END PART CT_TAB
--END SECTION CREATE TAB

--SECTION LOAD
--FOREACH
--PART LD_TAB           — 636
LOAD TABLE ... ; ―
--END PART LD_TAB
--END FOREACH
--END SECTION LOAD

--SECTION CREATE IDX
--FOREACH <TAB>
--PART CT_IDX
CREATE INDEX ... ON <TAB> ... ;
CREATE UNIQUE INDEX ... ON <TAB> ...;
--END PART CT_IDX
--END FOREACH
--END SECTION CREATE IDX
```

PARALLEL SQL SCRIPT

—SECTION CREATE TAB  ⎤
—WHENEVER ERROR STOP ⎬ — 642
—PART CT_TAB_1       ⎦
CREATE TABLE A ...   ⎤
CREATE TABLE B ...   ⎬ — 644
...                  ⎥
CREATE TABLE N ...   ⎦
—END PART CT_TAB_1
—END SECTION CREATE TAB

—SECTION LOAD        ⎤
—PART LD_TAB_1       ⎥
LOAD TABLE A ...     ⎥
—END PART LD_TAB_1   ⎥
—PART LD_TAB_2       ⎥
LOAD TABLE B ...     ⎬ — 646
—END PART LD_TAB_2   ⎥
...                  ⎥
—PART LD_TAB_X       ⎥
LOAD TABLE N ...     ⎥
—END PART LD_TAB_X   ⎥
—END SECTION LOAD    ⎦

—SECTION CREATE IDX
—PART CT_IDX_1
CREATE UNIQUE INDEX A1 ON TABLE A ... CREATE INDEX A2 ON TABLE A ...
—END PART CT_IDX_1
—PART CT_IDX_2
CREATE UNIQUE INDEX B1 ON TABLE B ... CREATE INDEX B2 ON TABLE B ...
—END PART CT_IDX_2
...
—PART CT_IDX_X
CREATE INDEX N1 ON TABLE N ...
—END PART CT_IDX_X
—END SECTION CREATE IDX

*FIG. 6D*

SYSTEMS AND METHODS FOR PARALLEL EXECUTION OF A PORTION OF A SCRIPT BY INTERPRETING COMMENTS IN THE SCRIPT AS PARALLEL CONTROL STATEMENTS

FIELD

Some embodiments relate to systems and methods associated with a parallel script executer. More specifically, some embodiments are directed to systems and methods to automatically allow for the parallel execution of script commands in a simple fashion.

BACKGROUND

In some cases, running scripts in sequential manner can be time consuming. That may be especially true, for example, when the script is associated with the maintenance of relatively large databases. To run a script in parallel, however, a database administrator may need to break a larger script into multiple shorter scripts that are able run in parallel. The organization and administration of such multiple scripts can be a complex and error-prone process. For example, there might be dependencies within the script commands such that not all parts can run concurrently.

Accordingly, methods and mechanisms to efficiently, accurately, and automatically allow for the parallel execution of script commands in a simple fashion may be provided in accordance with some embodiments described herein.

BRIEF DESCRIPTION OF THE DRAWINGS

FIGS. 3A and 3B are an example of a parallel SQL script in accordance with some embodiments

FIGS. 6A through 6D illustrate a system associated with a parallel script creator in accordance with some embodiments.

DETAILED DESCRIPTION

Running scripts, such as Structured Query Language ("SQL") scripts, in a sequential manner can be time consuming. That may be especially true, for example, when the SQL script is associated with the maintenance of relatively large databases. To run a SQL script in parallel, however, a database administrator may need to break a larger SQL script into multiple shorter SQL scripts that are able run in parallel. The organization and administration of such multiple SQL scripts can be a complex and error-prone process. For example, there might be dependencies within the SQL script commands such that not all portions can run concurrently.

Accordingly, a method and mechanism to efficiently, accurately, and automatically allow for the parallel execution of script commands in a simple fashion may be provided in accordance with some embodiments described herein. According to some embodiments, a single SQL script may be created with embedded control statements, implemented as SQL comments, which direct a parallel SQL script executer" to break the SQL script, at runtime, into several sections that contain parallel parts. Parallel parts within the same section may run concurrently while two sections may run one after another, sequentially.

Figure 1:
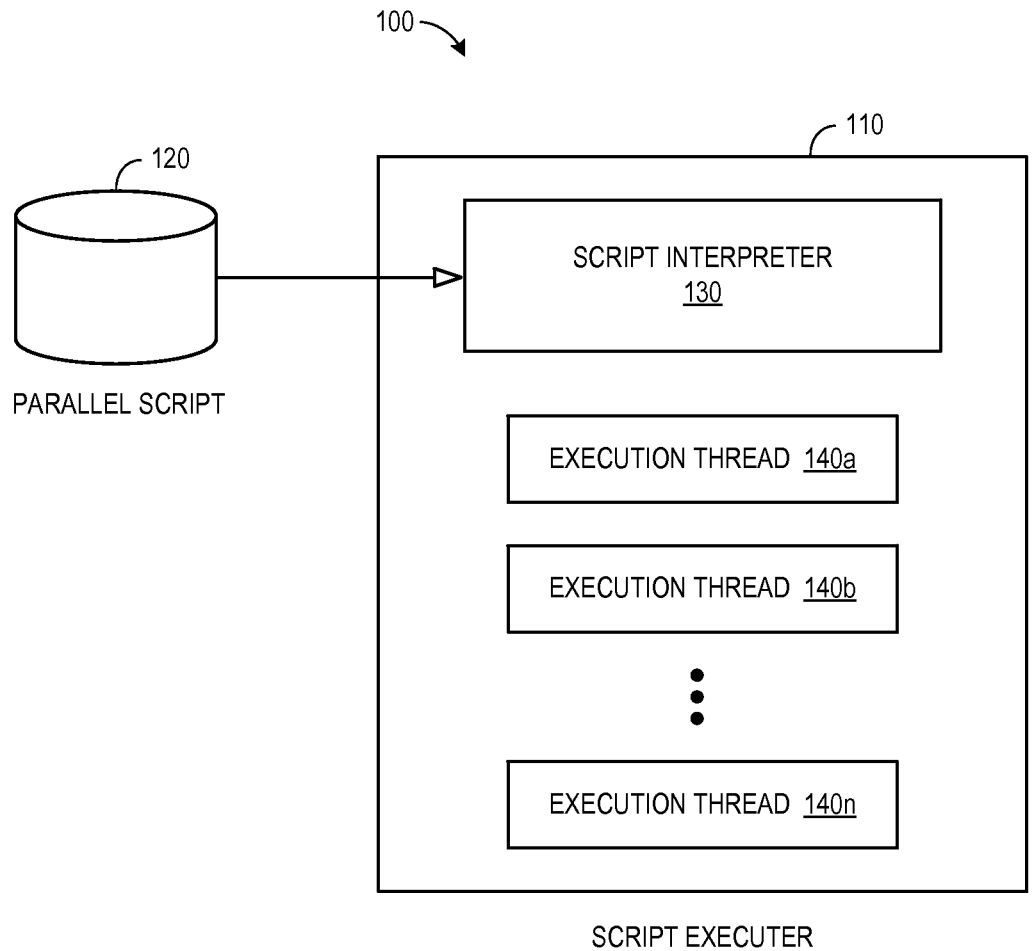
FIG. 1 is a block diagram of a system according to some embodiments.

FIG. 1 is a block diagram 100 of a system according to some embodiments. The system 100 includes a script executer 110 that may receive a parallel script 120. In particular, the script executer 110 may include a script interpreter 130 that receives the parallel script 110 and automatically arranges (e.g., at run-time) for portions of the parallel script 110 to run in parallel via multiple execution threads 140a, 140b, . . . 140n.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the script executer 110 and parallel script 120 (e.g., a device storing the parallel script), may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
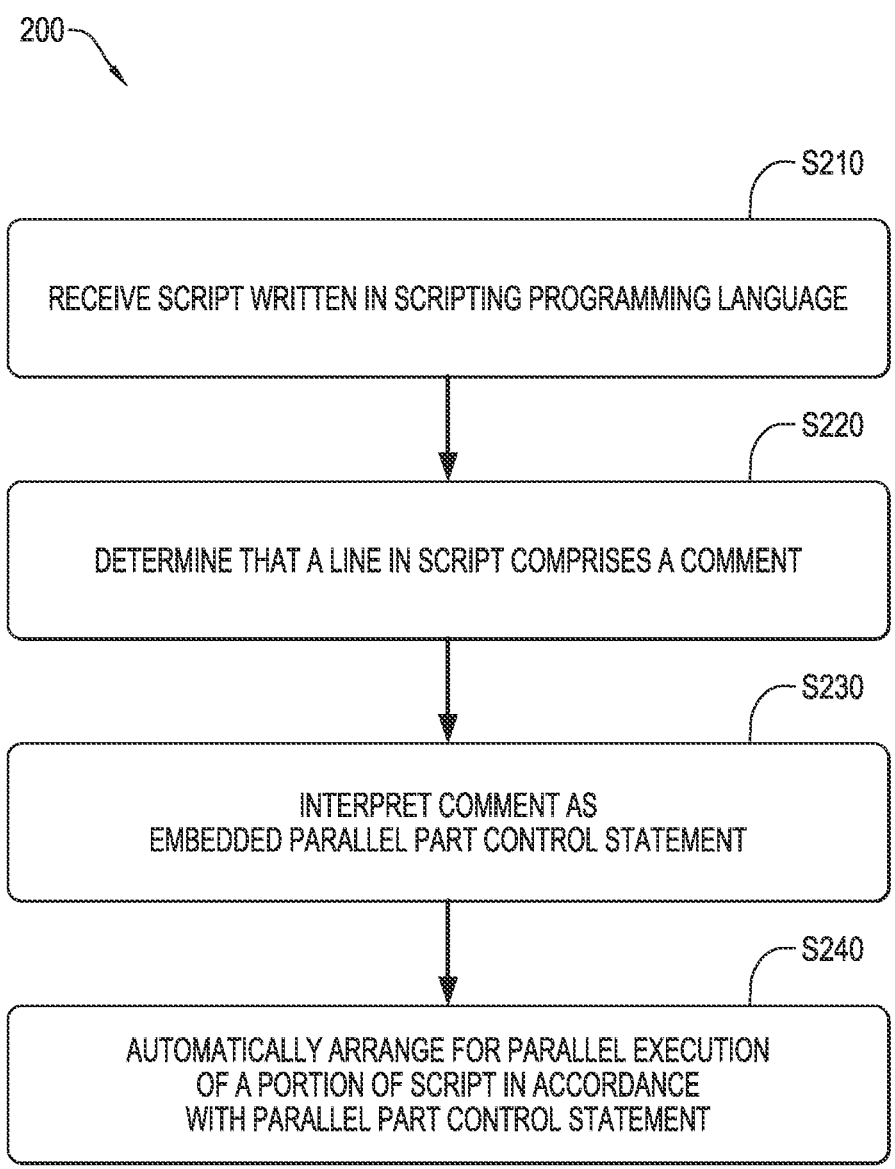
FIG. 2 is a flow diagram of a process in accordance with some embodiments.

FIG. 2 is a flow diagram of a process 200 that might be associated with the script executer 110 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, a script written in a scripting programming language may be received. For example, the script executer 110 may access a file containing an SQL script. At S220, it may be determined that a line in the script comprises a comment. In the case of an SQL script, for example, a line that begins with two dashes ("- -") may be determined to be a comment (that is, the characters following the two dashes are traditionally ignored by a script executer).

At S230, the comment may be interpreted as an embedded "parallel part control statement." The interpretation might be associated with, for example, a comparison of the comment to a pre-determined syntax. In the case of an SQL script, for example, the characters "- - Part A1" might be interpreted as a "start" parallel part statement. Similarly, the characters "- - End Part A1" might be interpreted as an "end" parallel part statement.

At S240, parallel execution of a portion of the script may be automatically arranged in accordance with the parallel part control statement. For example, one portion of an SQL script between "- - Part A1" and "- - End Part A1" statements might execute in parallel with another portion of the script between "- - Part A2" and "- - End Part A2" statements.

Note that there may be other types of parallel part statements in addition to "start" and "end." For example, the characters "- - Whenever error PERFORM A->A2 WITH 2 RETRIES" might be interpreted as a "whenever" statement. In this case, when the parallel part is executing and an error occurs, the thread will perform part A2 of section A with two retries (e.g., so that portion of code may be executed three times in total).

Moreover, there may be other types of embedded statements in addition to parallel part statements. For example, it might be determined that another line in the script comprises another comment. Moreover, this comment may be interpreted as an embedded "section" control statement. The interpretation might be associated with, for example, a comparison of the comment to a pre-determined syntax. In the case of an SQL script, for example, the characters "- - Section A" might be interpreted as a "start" section statement. Similarly, the characters "- - End Section A" might be interpreted as an "end" section statement.

As a result, execution of a portion of the script might be automatically arranged in accordance with the section control statement. For example, one portion of the SQL script between "- - Section A" and "- - End Section A" statements might execute sequential to another portion of the script "- - Section B" and "- - End Section B" statements.

Note that there may be other types of section statements in addition to "start" and "end." For example, the characters "- - Whenever error STOP" might be interpreted as a "whenever" statement. In this case, section is executing and an error occurs, the thread will halt execution. As another example, the characters "- - Set priority HIGH" might be interpreted as a "set priority" statement. In this case, processing threads might be allocated to execute portions of the script in accordance with the set priority statement.

There may be still other types of embedded statements in addition to parallel part and section statements. For example, it might be determined that another line in the script comprises another comment. Moreover, this comment may be interpreted as an embedded "include" control statement. The interpretation might be associated with, for example, a comparison of the comment to a pre-determined syntax. In the case of an SQL script, for example, the characters "- - Include <Update Statistics>" might be interpreted as an "include" statement. In this case, it may be arranged to include execution of another script in accordance with the include control statement.

According to some embodiment, a section and/or part associated with parallel code execution may be implicitly defined by and/or created for a script file. For example, a portion of a script might not include any parallel section or part commands. In such a case, that portion may be automatically assigned to a section and/or part. Consider the following example where the "Create Table" and "Insert Into" SQL commands are not within section A or part A1:
 CREATE TABLE . . .
 INSERT INTO . . .
 --SECTION A
 --PART A1
 CREATE INDEX . . .
 --END PART A1
 --END SECTION A In such a situation, a new section Z and part Z1 may be automatically created for those two commands. That is, the script might be interpreted as follows:
 --SECTION Z
 --PART Z1
 CREATE TABLE . . .
 INSERT INTO . . .
 --END PART Z1
 --END SECTION Z
 --SECTION A
 --PART A1
 CREATE INDEX . . .
 --END PART A1
 --END SECTION A Now consider FIGS. 3A and 3B which provide an illustration of a parallel SQL script 300 in accordance with some embodiments. This script 300 starts with section A 310 and executes part A1 (creating tables 1 through 3) and part A2 (dropping and creating table 4) in parallel. Note that the overall section A 310 may be associated with one error response 312 while a particular part A2 within that section A 310 may override that with a different error response 314.

After both parts A1 and A2 have completed, section A 310 is complete and section B 320 may begin to execute. Specifically, parts B1, B2, and B3 may execute in parallel. Because section B220 is set as a high priority via line 322, all three parts may be executed in parallel (e.g., via three execution threads). Note that line 324 may result in a notification when an error occurs during execution of section B 320. Moreover, line 326 may result in execution of part A2 of section A 310 when an error occurs.

When all three parts of section B 320 complete execution, section B 320 is complete and section C 330 may start. In section C 330 there are four parts: C1, C2, C3, and C4. All four parts might be executed in parallel, but since section C 330 is set as a medium priority at line 332, perhaps fewer than four execution threads might be associated to the section. For example, only three threads might be allocated to section C 330, and, as a result, parts C1, C2, and C3 may be executed simultaneously. When one of these three parts completes execution, part C4 may begin to execute.

After all four parts of section C 330 are completed, section D 340 may begin execution. Note that line 342 of section D 340 may result in the execution of another script called "Update Statistics." If this other script contains control statements, it may be executed in accordance with any of the embodiments described herein. Section D 340 is defined as low priority, so the script executor may use, for example, at most only two threads. Once section D 340 completes execution, the whole script 300 is completed.

Note that error handling in this script 300 may be established by error handling control statements that define operations for different sections and/or parts. For example, section A 310 was configured by line 312 to stop if there is an error, and part A1 may inherit that behavior. In contrast, line 314 may override that behavior for part A2 . As a result, if a statement fails in part A1 the script 300 stops, but if statement fails in part A2 the script 300 will continue to execute.

Figure 3B:
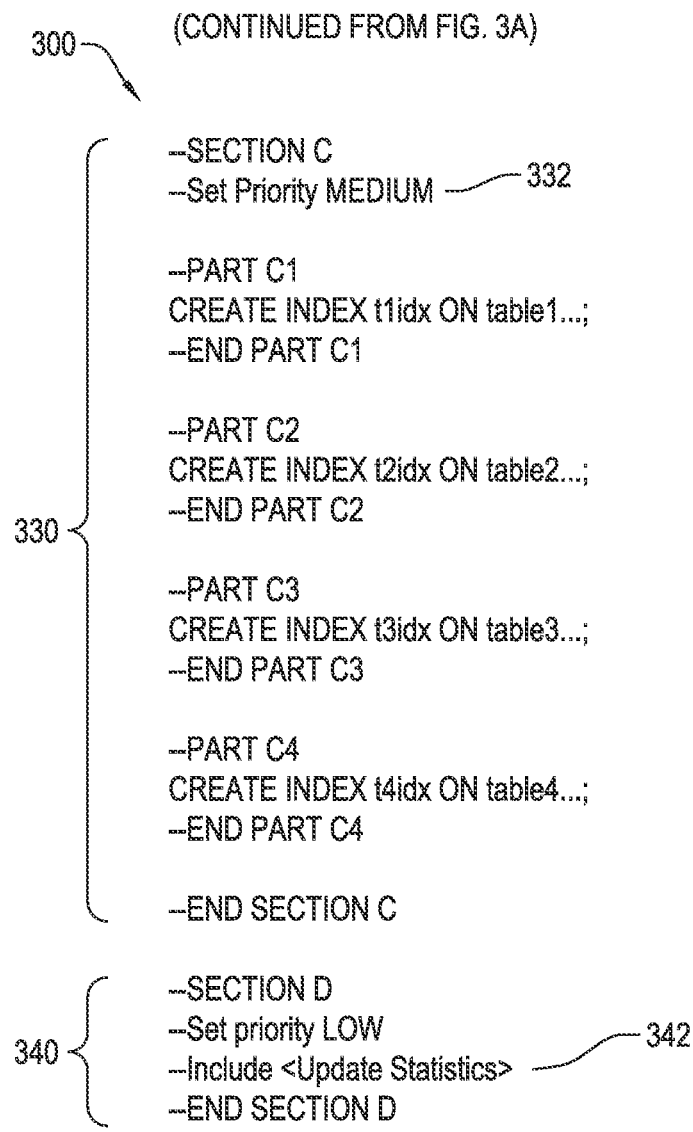
Figure 4A:
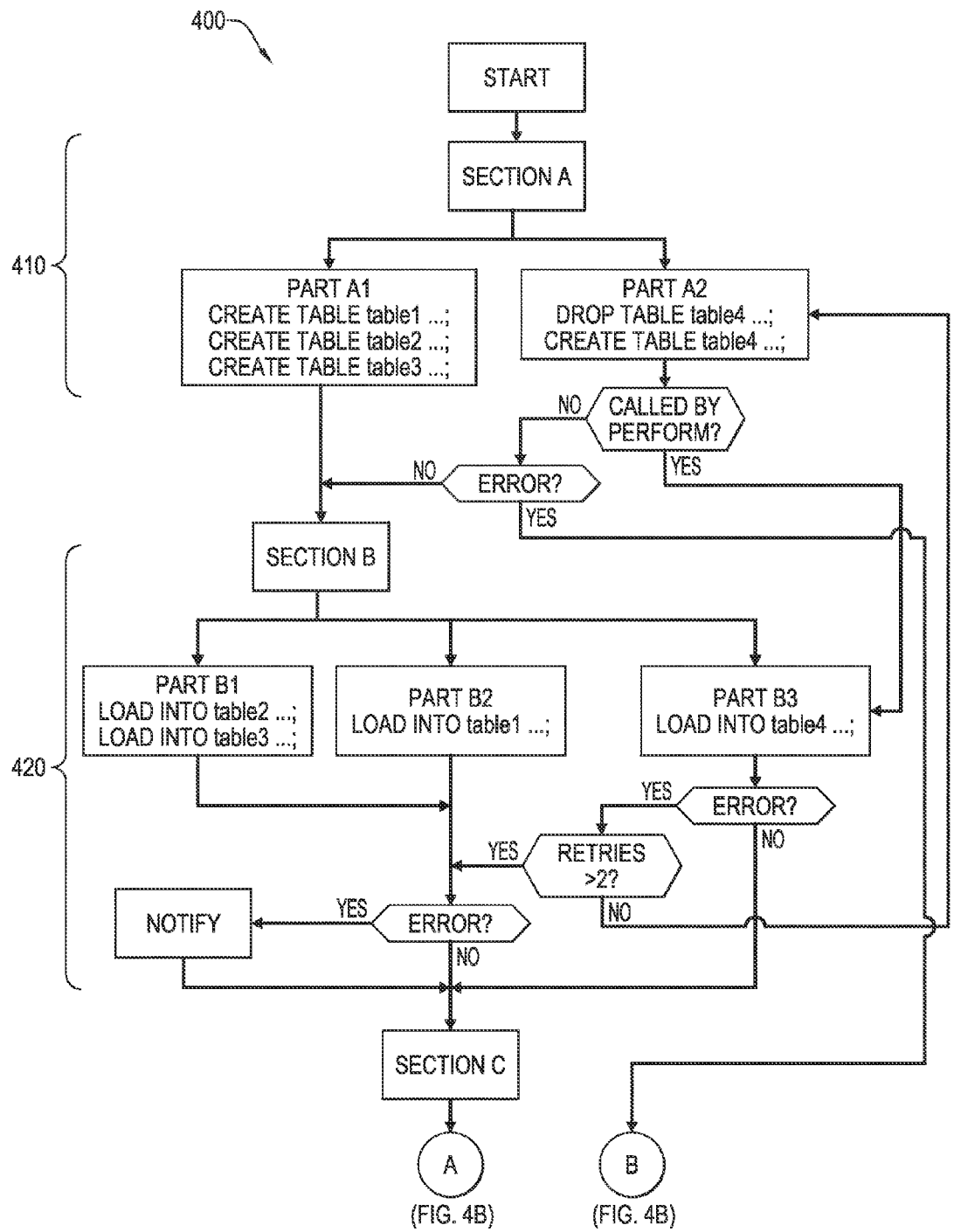
FIGS. 4A and 4B are an execution flow diagram associated with the script of FIGS. 3A and 3B according to some embodiments disclosed herein.
Figure 4B:
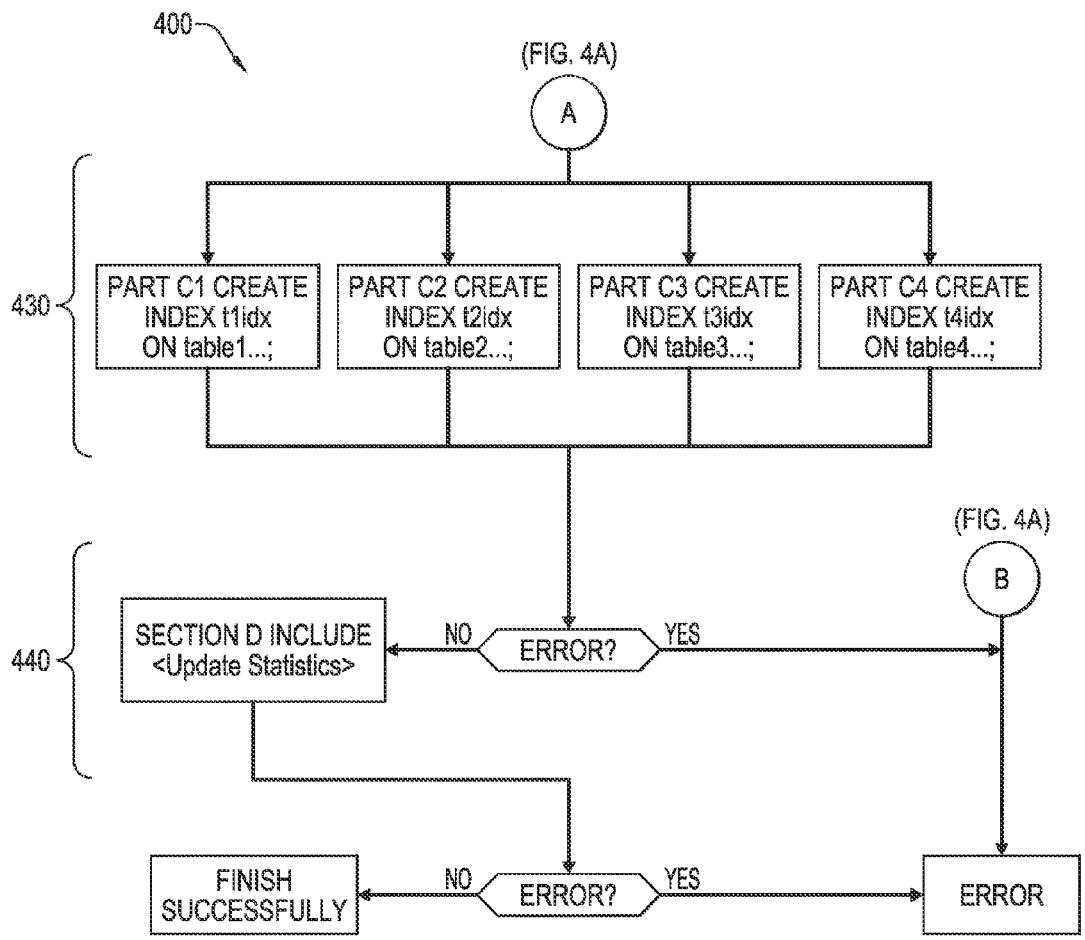

FIGS. 4A and 4B are an execution flow diagram 400 associated with the script 300 of FIGS. 3A and 3B according to some embodiments disclosed herein. As illustrated in the diagram 400, parts A1 and A2 of section A 410 in the script 300 execute in parallel to completion before section B 420 begins. Parts B1, B2, and B3 then execute in parallel before section C 430 begins. Note that the error handling for part B3 is different (part A2 is executed for two retries) as compared to parts B1 and B2 (a notification such as an email or Short Message Statement (SMS) text might be provided and execution continues). Section C 430 then executes parts C1, C2, C3, and C4 before section D 440 to complete the flow 400.

Although embodiments described herein may provide a relatively simple way to allow for parallel processing within scripts, note that creating such a script might still be challenging (e.g., to a novice database administrator). For example, he or she may need to put the right embedded control statement into the script in order to get the correct result. In order to simplify this task, some embodiments automatically creating such a script by applying a pre-created template onto a plain SQL script. The template may be designed, for example, with a pattern that contains various embedded control statement with sample SQL commands. Applying such a pattern onto a plain SQL script may result in the creation of a new script containing the embedded control statement from the template along with SQL commands from the plain SQL script assigned to the appropriate sections. The templates might be, for example, pre-delivered as a specific task template for a novice database administrator or might be created by a relatively skilled administrator.

Figure 5:
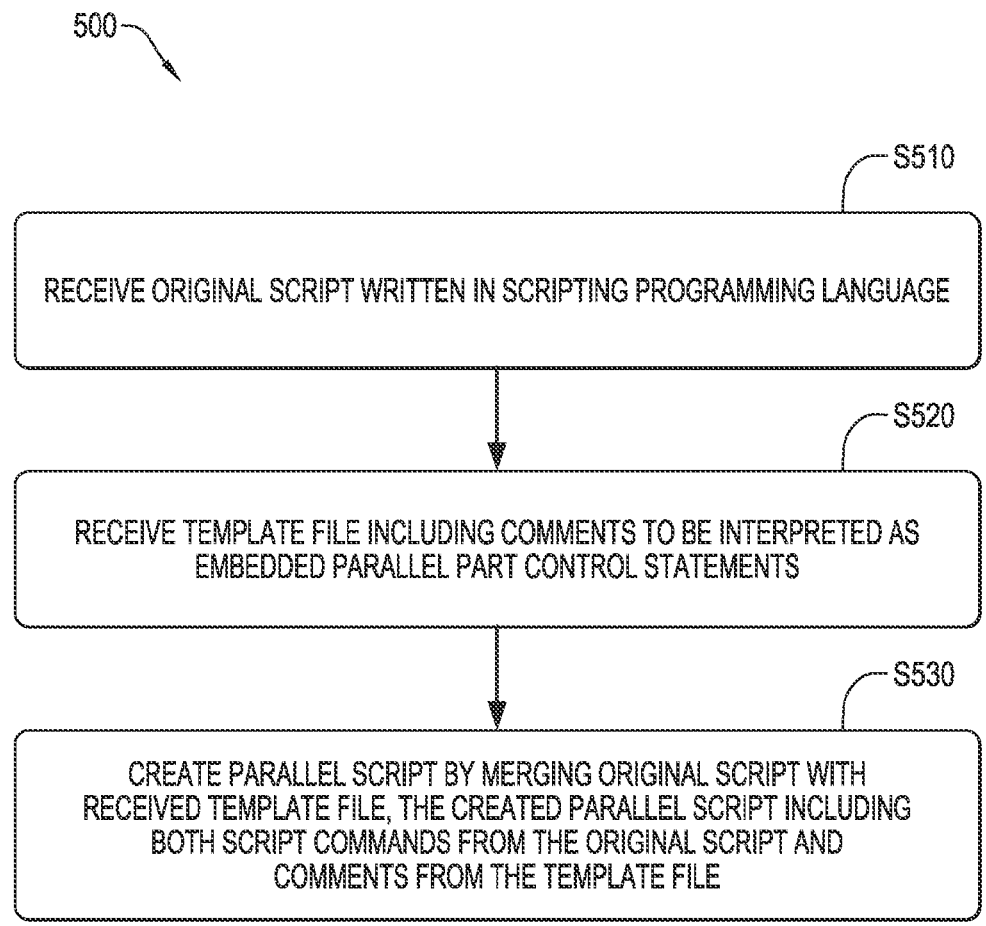
FIG. 5 is a flow diagram of a process in accordance with another embodiment.

By way of example, FIG. 5 is a flow diagram of a process 500 in accordance with another embodiment. At 502, an original script written in a scripting programming language may be received. For example, a standard SQL script file (e.g., without any special provisions for parallel processing) might be received. At 504, a template file, including comments to be interpreted as embedded parallel part control statements, may be received. A parallel script may then be created at 506 by merging the original script with the received template file. The created parallel script may include, for example, both script commands from the original script and comments from the template file. It may then be arranged for the parallel execution of a portion of the created parallel script in accordance with the parallel part control statements.

Figure 6A:
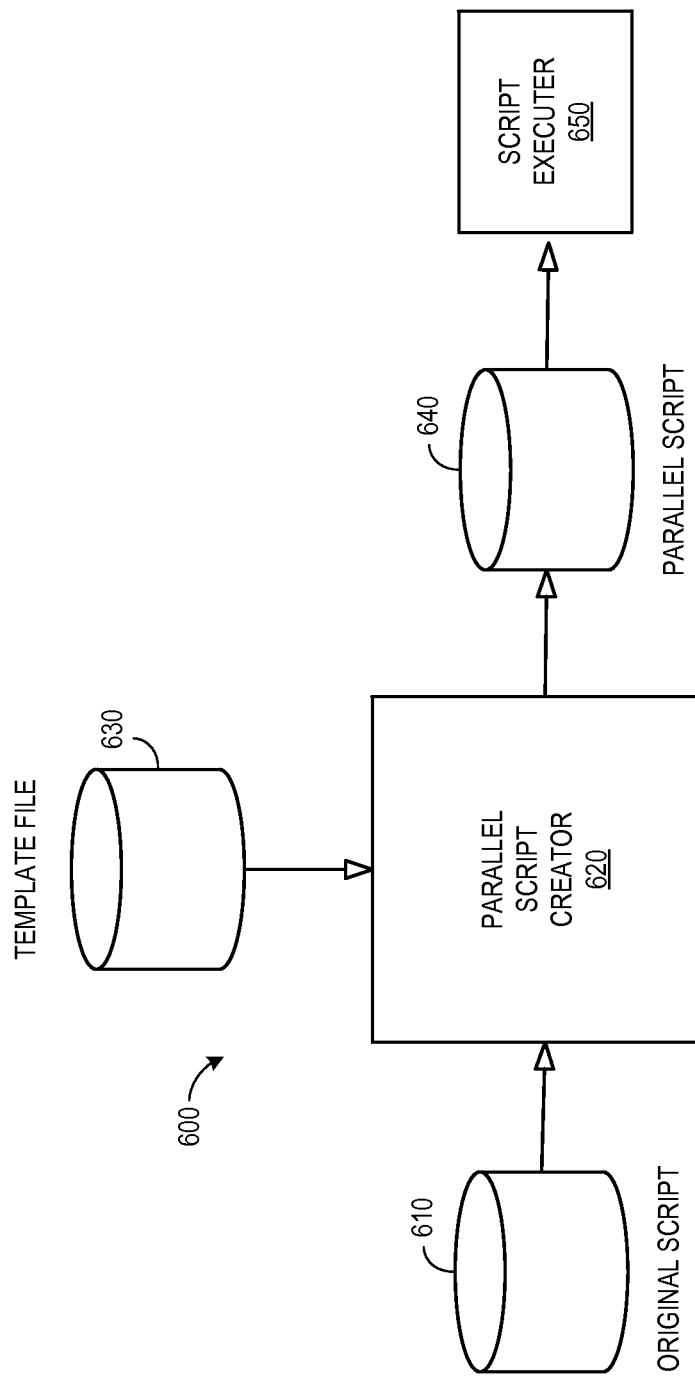

FIGS. 6A through 6D illustrate a system 600 to process an original script 610 according to some embodiments. In particular, an original script 610 is received by a parallel script creator 620 along with a template file 630. As shown in FIG. 6B, the original script 610 may contain standard SQL commands without any parallel processing. As shown in FIG. 6C, the template file 620 may include comments that may later be interpreted by a script executer 650 as parallel control statements (e.g., "- - Section Load" and "- - End Section Load"). The parallel script creator 620 may merge the original script 610 and template file 630 to create a parallel script 640 that includes both script commands from the original script 610 and parallel control statement from the template file 630. A script executor 650 may then execute portions of the parallel script 640 simultaneously as appropriate.

For example, the template file 630 might contain control statements, template control statements, and SQL command patterns. The SQL commands patterns might be, for example, a partial SQL command with regular expression parts. The template control statements may be associated with, for example, an iterator. The iterator may be, for example, a specific token from the SQL commands pattern or an empty iterator. Both may iterate the SQL commands in the input file. The template file 630 might be, for example, pre-delivered as a specific task template for a relatively inexperienced administrator (e.g., a template to migrate a database) or might instead be created by a skilled administrator.

Referring to FIG. 6C, the first three lines 632 of the template file 630 may be used to create the first three lines 642 of the parallel script 640, including the section ("- - SECTION CREATE TAB") and part openings ("- - PART CT_TAB"). Next, there is a "for each" template control statement ("- - FOREACH") on "CREATE TABLE" 634 (illustrated as bold in FIG. 6C). As a result, all N of the create table commands from the original script 610 are gathered and placed into this corresponding portion 644 of the parallel script 640. Similarly, the "- - END PART CT_TAB" and "- - END SECTION CREATE TAB" may be applied from the template file 630 to the parallel script 640.

Next, a new section may be opened by the template file 630, and the part definition has a foreach template control statement associated with "LOAD TABLE" 636. Thus, the associated lines 646 may be generated for the parallel script 640. Similarly, a foreach iterate on a specific token from the SQL commands pattern ("- - FOREACH <TAB>") may be included in the template file 630. As a result, all commands that match the SQL command pattern with same token may be gathered into a single part. The SQL command pattern may be associated with a create index/create unique index, and the token may represent the name of the table. In this example, all create index commands that work on the same table may be gathered into one part while create index commands of another table will be written in another part. At the end of the parallel script 640, the last section may be ended.

Figure 7:
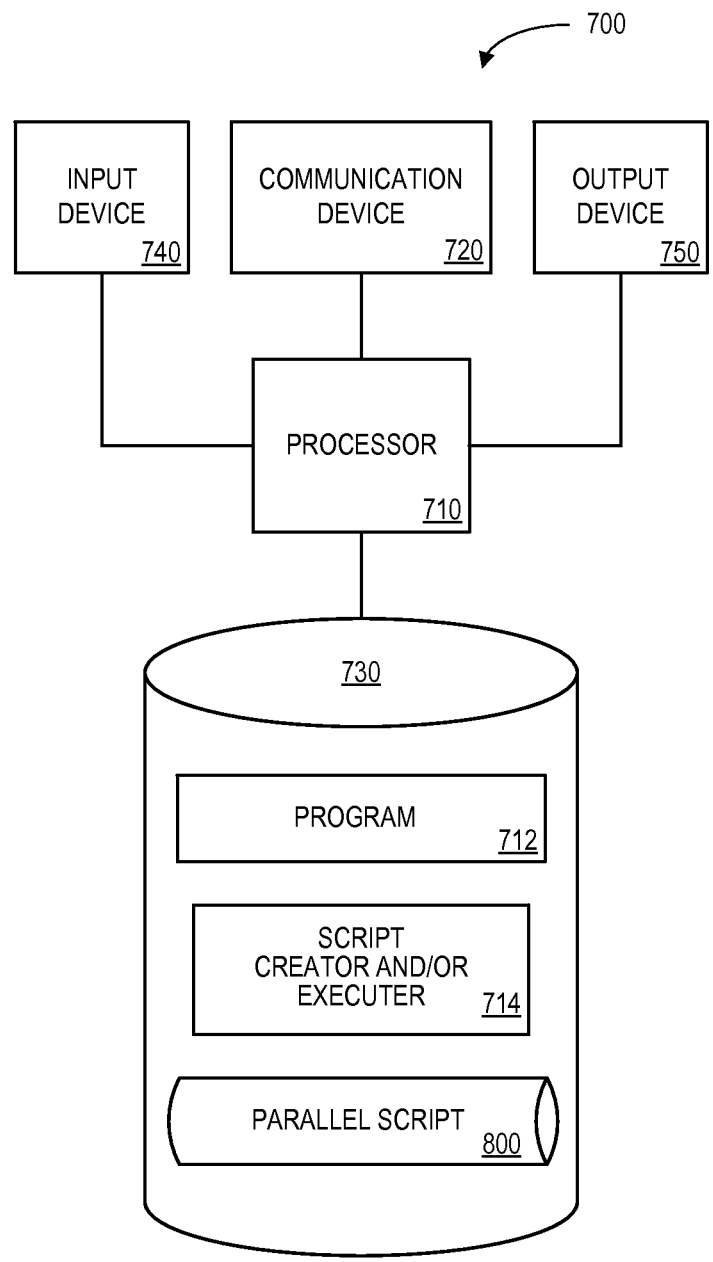
FIG. 7 is a block diagram of a system according to some embodiments.

The parallel script 640 may then be executed by the script executer 650. FIG. 7 is a block diagram overview of one such script executer 700 according to some embodiments. The script executer 700 may be, for example, associated with script executer 650 and/or parallel script creator 620 of FIG. 6A. The script executer 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used, for example, as an input path to receive a parallel script. The script executer 700 further includes an input device 740 (e.g., a mouse and/or keyboard to enter information about scripts and/or database tables) and an output device 750 (e.g., a computer monitor to display notifications and/or reports to an administrator).

The processor 710 communicates with a storage device 730. The storage device 730 may comprise any appropriate information storage device, including combinations of magnetic storage devices (e.g., a hard disk drive), optical storage devices, and/or semiconductor memory devices. The storage device 730 stores a program 712 and/or script creator and/or executer 714 for controlling the processor 710. The processor 710 performs instructions of the programs 712, 714, and thereby operates in accordance with any of the embodiments described herein. For example, the processor 710 may receive a script written in a scripting programming language. The processor 710 may then determine that a first line in the script comprises a first comment, and the first comment may be interpreted as an embedded parallel part control statement. Note that the phrase "first line in a script" and similar phrases (e.g., "second" or "third" lines in a script) may be used merely to reference multiple lines in a script and do not define a position of a line within the script. Parallel execution of a portion of the script may then be automatically arranged by the processor 710 in accordance with the parallel part control statement.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the script executer 700 from another device; or (ii) a software application or module within the script executer 700 from another software application, module, or any other source.

Thus, some embodiments may provide methods and mechanisms to efficiently, accurately, and automatically allow for the parallel execution of script commands in a simple fashion. Moreover, embodiments may provide for dependencies between sections such that one section may be executed only when a previous section is complete. Also, error handling (e.g., ignoring an error, stopping execution, or jumping to a repair section of the script) may be provided for each parallel section and/or parallel parts.

Further, a priority may be assigned for each parallel section to facilitate the control and usage of resources. For example, the level of parallelism might be controlled based on available resources. An administrator might, for example, define multiple parts in one section but control the degree of parallelism by using a mapping of priority levels to various degrees of parallelism. Embodiments may also provide real time alerts (e.g., associated with a failure or success of a section's execution) according to preconfigured notification rules. Some embodiments provide for the inclusion another script within a script (e.g., as in a programming language) while may facilitate a reuse of scripting code portions.

In some cases, specific sections and/or parts might be created for the purpose of error remediation. That is, those script lines might not be called in a normal course of execution, but instead only when there is an error that needs remediation. Still other embodiments might provide performance measurements for various sections and/or parts (e.g., associated with an amount of throughput).

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to SQL scripts, note that embodiments may be associated with other types of scripting languages. For example, Bourne shell (sh), c-shell (csh), TENEX-csh (tcsh) and/or command (cmd) scripts may be processed in accordance with any of the embodiments described herein.

Moreover, while embodiments have been illustrated using particular database table operations, embodiments may be implemented in any other of a number of different ways. For example, some embodiments might be associated with scripts that operate on different types of databases and/or perform functions other than database functions.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
receiving a Structured Query Language (SQL) script;
determining that a first line in the script comprises a first SQL comment;
interpreting the first SQL comment as a first embedded parallel part control statement;
determining that a second line in the script comprises a second SQL comment, wherein a portion of the script between the first embedded parallel part control statement and the second parallel embedded parallel part control statement define a first portion of the script;
interpreting a third SQL comment as a third embedded parallel part control statement;
determining that a fourth line in the script comprises a fourth SQL comment;
interpreting the fourth line as an embedded parallel part control statement, wherein a portion of the script between the third embedded parallel part control statement and the fourth parallel embedded parallel part control statement define a second portion of the script; and
automatically arranging for the parallel execution of the first portion of the script and the second portion of the script in accordance with the embedded parallel part control statements wherein a portion comprises one or more parts, wherein the first and third embedded parallel part control statements each comprise a start parallel part statement and the second and fourth embedded parallel part control statements each comprise an end parallel part statement, and wherein the first portion of the script executes in parallel with the second portion of the script.

2. The method of claim 1, wherein said interpreting comprises comparing the first SQL comment to a pre-determined syntax.

3. The method of claim 1, further comprising: determining that a fifth line in the script comprises a fifth SQL comment; interpreting the fifth SQL comment as an embedded section control statement; and arranging for execution of a portion of the script in accordance with the embedded section control statement, wherein a section comprises two or more parts.

4. The method of claim 3, wherein the embedded section control statement comprises at least one of: (i) a start section statement, (ii) an end section statement, (iii) a whenever statement, or (iv) a set priority statement.

5. The method of claim 4, wherein in a case that the embedded section control statement comprises a start section statement and an end section statement, one portion of the script between the start section statement and the end section statement executes sequential to another portion of the script between a second start section statement and a second end section statement.

6. The method of claim 4, wherein the embedded section control statement comprises a set priority statement, and processing threads are allocated to execute portions of the script in accordance with the set priority statement.

7. A non-transitory, computer-readable medium storing program code executable by a computer to:
receive a script having a plurality of lines and written in a SQL scripting programming language;
determine that a first line in the script comprises a first SQL comment;
interpret the first SQL comment as an embedded start parallel part control statement;
determine that a second line in the script comprises a second SQL comment;
interpret the second SQL comment as an embedded end parallel part control statement, wherein a portion of the plurality of lines between the start parallel part control statement and the end parallel embedded parallel part control statement define a first portion of the script;

determine that a third line in the script comprises a third SQL comment;

interpret the third SQL comment as a second embedded start parallel part control statement;

determine that a fourth line in the script comprises a fourth SQL comment;

interpret the fourth SQL comment as a second embedded end parallel part control statement, wherein a portion of the plurality of lines between the second start parallel part control statement and the second end parallel embedded parallel part control statement define a second portion of the script; and automatically arrange for parallel execution of the first portion of the script and the second portion of the script, wherein a portion comprises one or more parts, wherein the first and third embedded parallel part control statements each comprise a start parallel part statement and the second and fourth embedded parallel part control statements each comprise an end parallel part statement, and wherein the first portion of the script executes in parallel with the second portion of the script.

8. A system, comprising:

a processor; and a non-transitory computer readable medium comprising program code, that when executed by the processor:

receiving a script written in Structured Query Language (SQL);

determines that a first line in the script comprises a first SQL comment;

interprets the first SQL comment as a first embedded parallel part control statement;

determines that a second line in the script comprises a second SQL comment, wherein a portion of the script between the first embedded parallel part control statement and the second parallel embedded parallel part control statement define a first portion of the script;

interpreting a third SQL comment as a third embedded parallel part control statement;

determining that a fourth line in the script comprises a fourth SQL comment;

interpreting the fourth line as an embedded parallel part control statement, wherein a portion of the script between the third embedded parallel part control statement and the fourth parallel embedded parallel part control statement define a second portion of the script;

automatically arranging for the parallel execution of the first portion of the script and the second portion of the script in accordance with the embedded parallel part control statements wherein a portion comprises one or more parts, wherein the first and third embedded parallel part control statements each comprise a start parallel part statement and the second and fourth embedded parallel part control statements each comprise an end parallel part statement and wherein the first portion of the script executes in parallel with the second portion of the script;

determining that a fifth line in the script comprises a fifth SQL comment;

interpreting the fifth SQL comment as an embedded section control statement; and arranging for execution of a third portion of the script in accordance with the embedded section control statement, wherein in a section comprises two or more parts and wherein the embedded section control statement comprises at least one of: (i) a start section statement, (ii) an end section statement, (iii) a whenever statement, or (iv) a set priority statement.

9. A computer implemented method, comprising:

receiving an original Structured Query Language (SQL) script;

receive a template file, the template file including comments to be interpreted as embedded parallel part control statements;

creating a parallel script by merging the original script with the received template file, the created parallel script including both script commands from the original script and SQL comments from the template file and defining a first portion of the parallel script and a second portion of the parallel script, wherein the created parallel script comprises:

a first line comprising a first SQL comment where the first SQL comment is interpreted as a first embedded parallel part control statement;

a second line in the script comprising a second SQL comment, wherein a portion of the script between the first embedded parallel part control statement and the second parallel embedded parallel part control statement define the first portion of the script;

a third SQL comment interpreted as a third embedded parallel part control statement; and a fourth line in the script comprising a fourth SQL comment, wherein the fourth line is interpreted as an embedded parallel part control statement, wherein a portion of the script between the third embedded parallel part control statement and the fourth parallel embedded parallel part control statement define the second portion of the script, and wherein the first and third embedded parallel part control statements each comprise a start parallel part statement and the second and fourth embedded parallel part control statements each comprise an end parallel part statement; and automatically arranging of the first portion of the created parallel script and the second portion of the created script in accordance with the parallel part control statements, wherein a portion comprises one or more parts, wherein the first portion of the script executes in parallel with the second portion of the script.

* * * * *